US009146328B2

(12) United States Patent
Gomez et al.

(10) Patent No.: US 9,146,328 B2
(45) Date of Patent: Sep. 29, 2015

(54) CONTROLLABLE SEISMIC SOURCE (71) Applicant: Honeywell Federal Manufacturing & Technologies, LLC, Kansas City, MO (US)

(72) Inventors: Antonio Gomez, Kansas City, MO (US); Paul Jeffrey DeRego, Kansas City, MO (US); Patrick Andrew Ferrell, Kansas City, MO (US); Robert Anthony Thom, Kansas City, MO (US); Joshua J. Trujillo, Kansas City, MO (US); Brian Herridge, Chaska, MN (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 14/184,539

(22) Filed: Feb. 19, 2014

(65) Prior Publication Data
US 2014/0262596 A1 Sep. 18, 2014

Related U.S. Application Data (63) Continuation of application No. 13/829,730, filed on Mar. 14, 2013, now Pat. No. 8,807,266.

(51) Int. Cl.
*G01V 1/155* (2006.01)
*G01V 1/09* (2006.01)
*G01V 1/16* (2006.01)

(52) U.S. Cl.
CPC *G01V 1/155* (2013.01); *G01V 1/09* (2013.01); *G01V 1/168* (2013.01)

(58) Field of Classification Search
CPC ........... G01V 1/04; G01V 1/09; G01V 1/147; G01V 1/155

USPC .......................................... 181/113, 114, 121
See application file for complete search history.

(56) References Cited

U.S. PATENT DOCUMENTS

| | | | |
|---|---|---|---|
| RE26,825 E * | 3/1970 | Kenney ........................ | 181/114 |
| 4,564,083 A * | 1/1986 | Layotte et al. ................ | 181/114 |
| 4,609,066 A * | 9/1986 | Layotte et al. ................ | 181/121 |
| 5,483,026 A * | 1/1996 | Hasbrouck et al. ........... | 181/121 |
| 6,831,877 B2 * | 12/2004 | Hardage et al. ............... | 367/189 |
| 7,650,962 B2 * | 1/2010 | Quinn et al. .................. | 181/121 |
| 8,061,471 B2 * | 11/2011 | Wei ............................... | 181/121 |
| 8,261,875 B2 | 9/2012 | Eick et al. | |
| 2005/0224279 A1 * | 10/2005 | Gilmer et al. ................ | 181/121 |
| 2007/0205042 A1 | 9/2007 | Temple et al. | |

FOREIGN PATENT DOCUMENTS

EP 1085347 B1 5/2008
WO 2008097352 A1 5/2008

* cited by examiner

*Primary Examiner* — Jeremy Luks
(74) *Attorney, Agent, or Firm* — Hovey Williams LLP (57) ABSTRACT An apparatus for generating seismic waves includes a housing, a strike surface within the housing, and a hammer movably disposed within the housing. An actuator induces a striking motion in the hammer such that the hammer impacts the strike surface as part of the striking motion. The actuator is selectively adjustable to change characteristics of the striking motion and characteristics of seismic waves generated by the impact. The hammer may be modified to change the physical characteristics of the hammer, thereby changing characteristics of seismic waves generated by the hammer. The hammer may be disposed within a removable shock cavity, and the apparatus may include two hammers and two shock cavities positioned symmetrically about a center of the apparatus.

19 Claims, 8 Drawing Sheets

CONTROLLABLE SEISMIC SOURCE

RELATED APPLICATION

This is a continuation of U.S. application Ser. No. 13/829,730, filed Mar. 14, 2013, entitled CONTROLLABLE SEISMIC SOURCE, which is hereby incorporated by reference into the present application in its entirety.

GOVERNMENT INTERESTS

The present invention was developed with support from the U.S. government under a contract with the U.S. Department of Energy, Contract No. DE-NA0000622. Accordingly, the U.S. government has certain rights in the present invention.

FIELD

Embodiments of the present invention relate to seismic sources for use in seismic surveying applications. More particularly, embodiments of the present invention relate to seismic sources with selectively controlled operation configured to generate seismic waves with different characteristics.

BACKGROUND

Seismic surveying is a technique for generating information about an area below the earth's surface to identify subterranean structural features, such as voids or changes in composition. Petroleum companies, for example, use seismic surveying to explore for oil and gas reserves. Seismic surveying involves introducing one or more seismic waves into the area to be surveyed and sensing seismic activity at one or more locations on and/or below the surface of the earth in or near the surveyed area. The seismic waves may be generated, for example, by a controlled explosion or large "hammer" strike at the surface of the area to be imaged. One or more seismic sensors may be placed on and/or below the earth's surface to detect seismic activity caused by the waves. Such seismic activity typically includes seismic energy reflected back to the earth's surface as the seismic waves encounter structural discontinuities in the surveyed area. Seismic surveying systems use the seismic activity information collected by the sensors to generate information about subterranean composition and structure and may express the information in the form of paper traces or display images.

Seismic waves may be classified as compressional waves or shear waves. Compressional waves, sometimes referred to as primary waves, pressure waves or P-waves, are generally longitudinal in that the particles in the medium through which the waves travel vibrate along or parallel to the direction of travel of the wave energy. Shear waves, also referred to as secondary waves or S-waves, are generally transverse in that the particles in the medium through which the waves travel vibrate in a direction that is perpendicular or transverse to the direction of travel of the wave energy. Compressional waves and shear waves possess different characteristics. Compressional waves, for example, typically propagate at a higher speed than shear waves and are capable of propagating through fluid, while shear waves are not.

The above section provides background information related to the present disclosure which is not necessarily prior art.

SUMMARY

An apparatus for generating seismic waves constructed in accordance with an embodiment of the present invention comprises a housing, a strike surface within the housing, and a hammer movably disposed within the housing. An actuator induces a striking motion in the hammer wherein the hammer impacts the strike surface as part of the striking motion. The actuator is selectively adjustable to change characteristics of the striking motion and characteristics of seismic waves generated by the impact. During operation, the apparatus is placed against a surface of the ground such that when the hammer impacts the strike surface energy is transferred from the hammer to the housing and from the housing into the ground to generate seismic waves. The strike surface may be normal to the surface of the ground so that the apparatus primarily or exclusively generates shear seismic waves.

An apparatus constructed in accordance with a related embodiment of the invention includes a first shock structure removably disposed within the housing and defining a first shock cavity, a first hammer movably disposed within the first shock structure, a second shock structure removably disposed within the housing and defining a second shock cavity, and a second hammer movably disposed within the second shock structure. The actuator is operable to move the hammers and cause each of the hammers to strike an internal surface with a striking motion. The actuator is selectively adjustable to modify characteristics of the striking motion of each of the hammers, including hammer speed and acceleration.

In another embodiment of the invention, a method of generating seismic waves comprises placing an apparatus against a ground surface. The apparatus is configured to generate seismic waves and includes a shock cavity, an actuator, and a first hammer positioned within the shock cavity. The actuator is controlled to induce a first striking motion in the first hammer such that the first hammer strikes a wall of the shock cavity and generates a first seismic wave. The actuator is also controlled to induce a second striking motion in the first hammer such that the first hammer strikes the wall of the shock cavity and generates a second seismic wave, wherein the second seismic wave is different than the first seismic wave.

An apparatus for generating seismic waves constructed in accordance with another embodiment of the invention comprises a housing, a hammer movably disposed within the housing, and an actuator for inducing continuous oscillating motion in the hammer, wherein the oscillating motion of the hammer creates a seismic wave. The actuator is selectively adjustable to change characteristics of the oscillating motion and characteristics of seismic waves generated by the motion.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The particular size and proportions of various aspects of the invention discussed herein may vary from one embodiment of the invention to another without departing from the spirit or scope of the invention. Therefore, any discussion herein of the dimensions and proportions are exemplary, and not limiting, in nature.

Turning now to the drawing figures, a seismic source apparatus 10 constructed in accordance with embodiments of the invention is illustrated. The apparatus 10 broadly includes a seismic shock assembly 12 and a mounting assembly 14 for securing the shock assembly 12 to a vehicle 16. The vehicle 16 may be a pickup truck, van, sport utility vehicle, tractor or other vehicle capable of carrying and enabling the apparatus 10 for its intended use. The apparatus 10 may be mounted on a hitch receiver, bumper, custom-made mounting system or other mounting mechanism capable of bearing the load associated with use of the apparatus 10. In some embodiments, the apparatus 10 is powered from the vehicle's power system such as, for example, a 12 volt DC vehicle power system or from a portable electric generator, such as a 120 volt AC generator.

The apparatus 10 may be used with a seismic surveying system 18 including one or more seismic sensors 20. In some applications it may be desirable to use the apparatus 10 with an array 22 of seismic sensors 20 attached to a rope or cable and secured to the vehicle 16 such that as the vehicle 16 pulls the sensor array 22 the array trails the vehicle in a linear configuration in a manner similar to that illustrated in FIG. 2. The array 22 of seismic sensors 20 illustrated in FIG. 2, for example, includes sixteen geophones attached to a rope or cable and spaced approximately one meter apart in a linear configuration extending from the back of the vehicle 16 where the apparatus 10 may be mounted. The sensor array 22 may include horizontal axis and/or vertical axis sensors. It may be advantageous to attach the array 22 to the vehicle 16 such that it lies on a line corresponding to a center of the apparatus 10, as explained below in greater detail.

Figure 2:
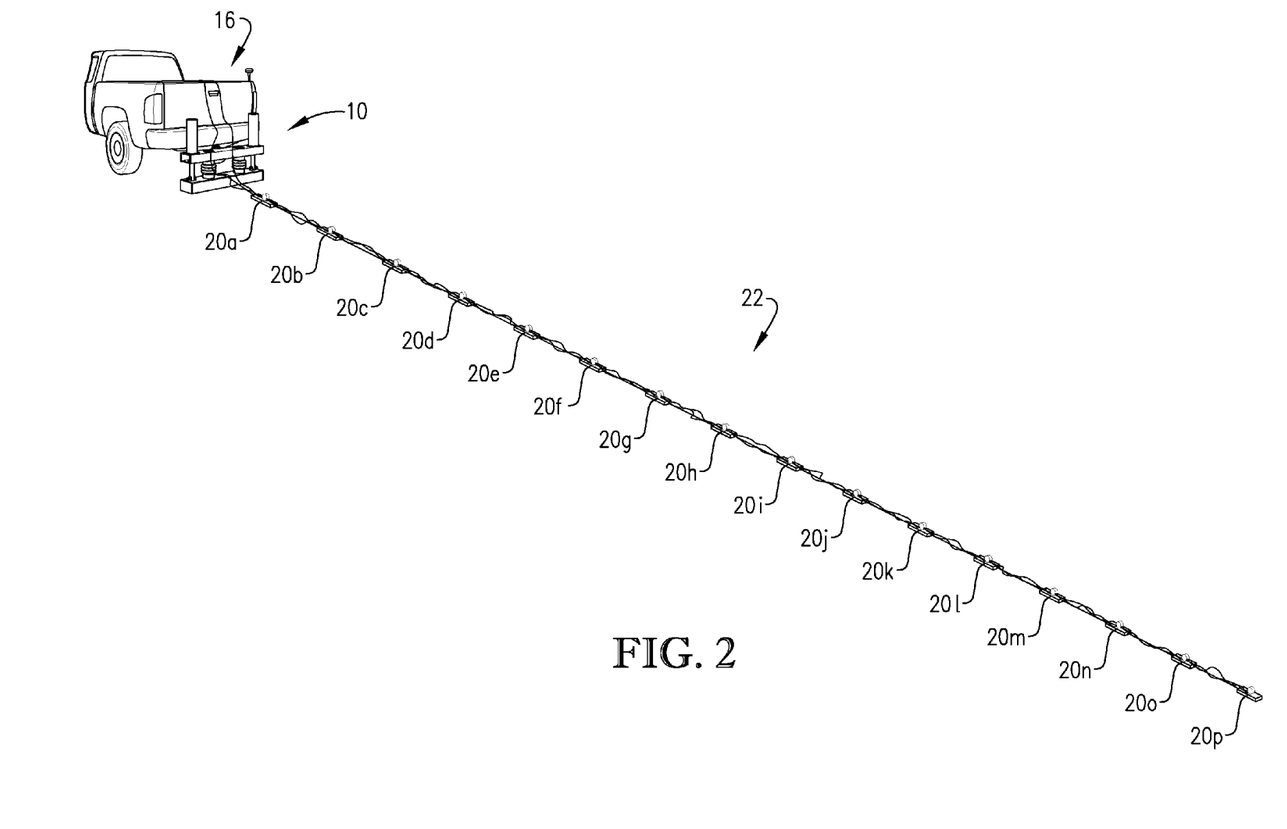
FIG. 2 is a rear perspective view of a vehicle for mounting the apparatus of FIG. 1 and including a plurality of seismic sensors attached to the vehicle.
Figure 3:
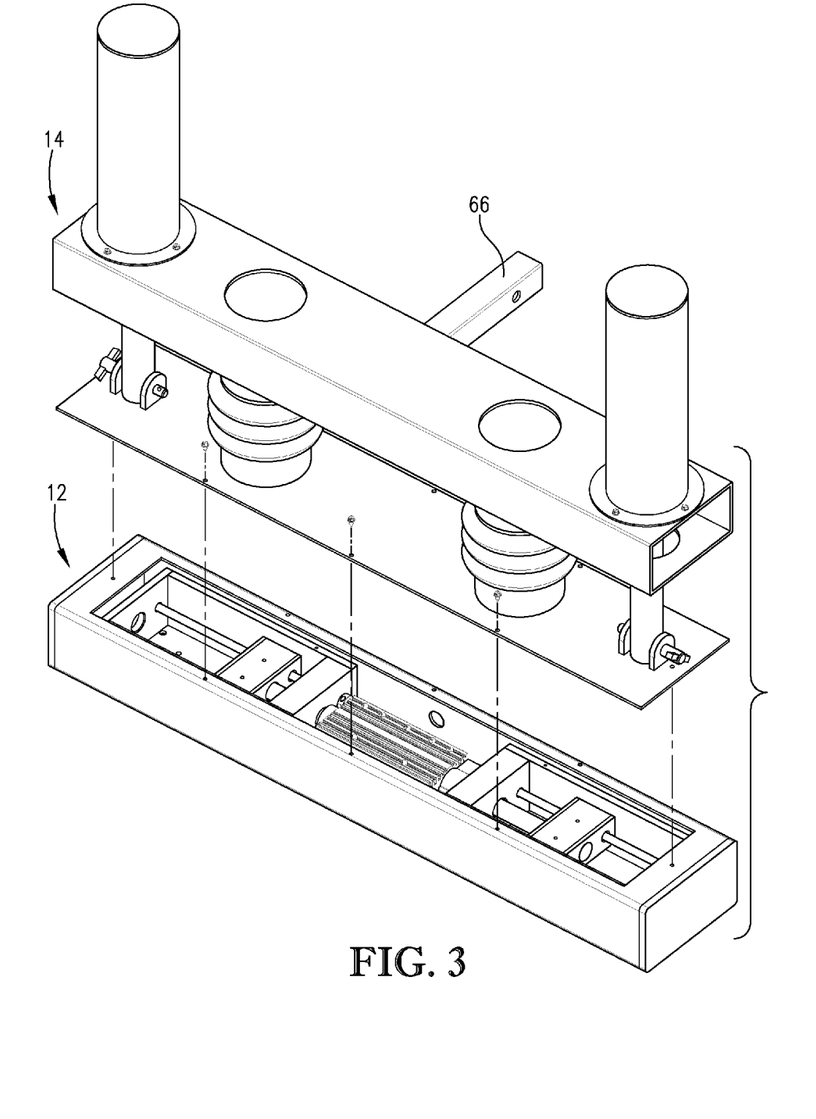
FIG. 3 is a top perspective exploded view of a portion of the seismic source apparatus of FIG. 1.
Figure 4:
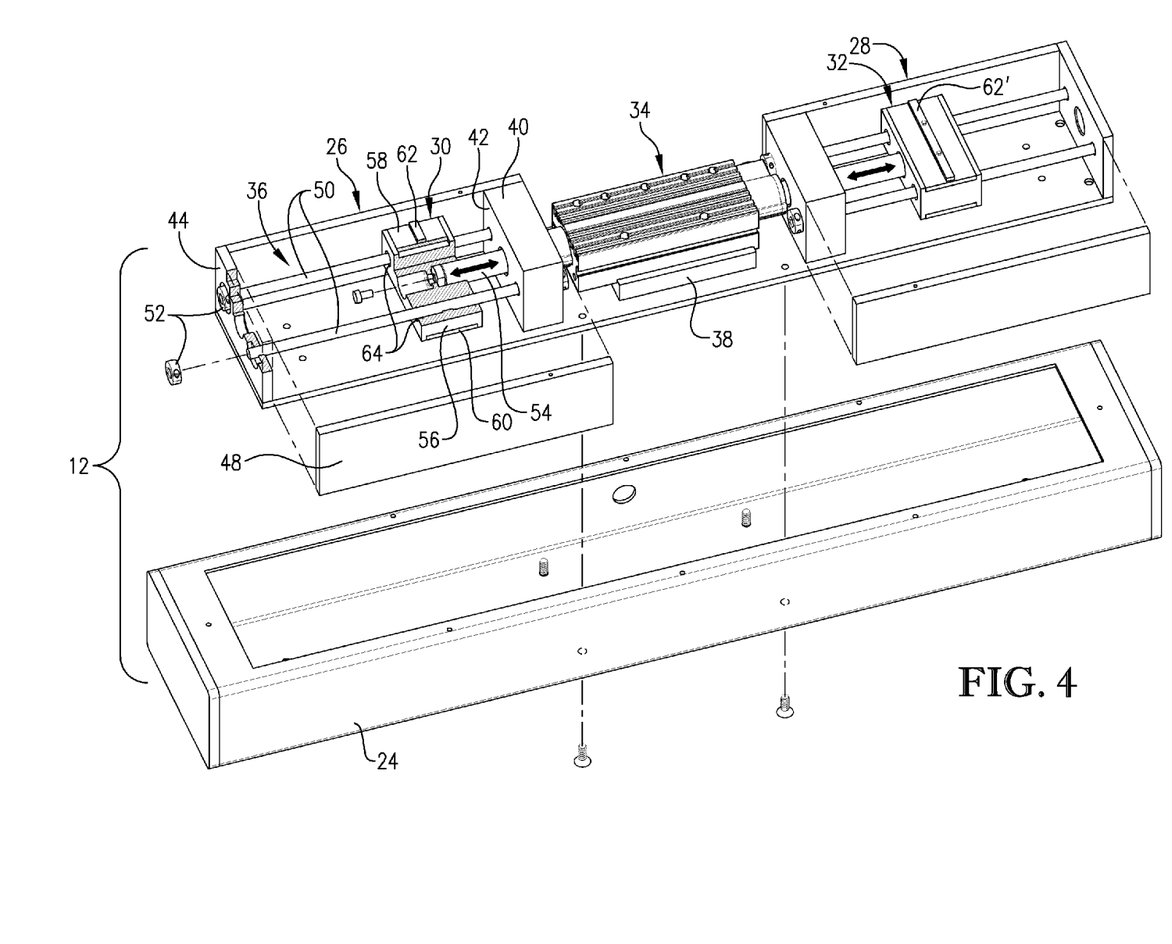
FIG. 4 is a top perspective exploded view of a shock assembly of the apparatus of FIG. 1.

With particular reference to FIGS. 3 and 4, the seismic shock assembly 12 broadly includes a housing 24, one or more shock structures 26, 28, a hammer 30, 32 moveably disposed within each of the one or more shock structures 26, 28, and a first actuator 34 for inducing movement in the hammers 30, 32. The illustrated embodiment includes two shock structures 26, 28 removably fixed in opposing ends of the housing 24. In some embodiments, the shock structures 26, 28 are positioned and operate symmetrically about a center of the housing 24. Such a configuration may be advantageous, for example, where a seismic sensor array such as the array 22 illustrated in FIG. 2 is aligned with a center of the apparatus 10. In such a scenario, the seismic waves generated by the shock structures 26, 28 are generated on both sides of, and symmetrically about, the sensor array 22. The shock structures 26, 28 may be identically configured, therefore only the first shock structure 26 will be described in detail herein with the understanding that the second shock structure 28 is similarly configured.

The shock structure 26 includes a plurality of walls that define an internal shock cavity 36 in which the hammer 30 operates. More specifically, a bottom wall 38 is part of both shock structures 26, 28 and supports the actuator 34. A first end wall 40 proximate the actuator 34 provides a strike surface 42 and therefore is configured to absorb repeated blows from the hammer 30 without compromising structural integrity. The first end wall 40 may be, for example, two to four times as thick as the other walls of the shock assembly 26. A second end wall 44 distal the actuator 34 corresponds to an end of the cavity 36 opposite the strike surface 42. A pair of side walls 46, 48 join the two end walls 40, 44 such that the walls 40, 44, 46 and 48 define the shock cavity 36. The size and shape of the shock cavity 36 accommodates movement of the hammer 30 as it goes through a striking motion wherein it impacts the strike surface 42.

The end walls 40, 44 support a pair of rails 50 that extend from the first end wall 40 to the second end wall 44 and guide movement of the hammer 42 as it reciprocates within the shock cavity 36. The rails 50 are removably secured to the shock structure 26 with collars 52 enabling, for example, the hammer 30 to be removed from the shock structure 26. A piston 54 extends through the first end wall 40 and is coupled with both the actuator 34 and the hammer 30 and allows the actuator 34 to drive the hammer 30. In some embodiments, one or more springs or similar elements (not shown) are interposed between the hammer 30 and the piston 54 to absorb the impact of the hammer 30 against the strike surface 42 and protect the hammer 30 and the actuator 34 from damage. In such embodiments, a selectively removable retainer or similar element (not shown) may be used to rigidly couple the hammer 30 with the piston 54 to prevent the hammer 30 from moving relative to the piston 54. The latter configuration may be desirable, for example, if the actuator 34 drives the hammer 30 in a reciprocating or "vibrating" motion without striking any surface of the shock structure 26.

As explained above, the bottom wall 38 may be a single, monolithic element supporting both of the shock structures 26, 28. Alternatively, each of the shock structures 26, 28 may have a separate bottom wall to enable each shock structure 26, 28 to be removed from the housing 24 separately from the other shock structure. Each of the end walls 40, 44 and side walls 46, 48 may be fixedly or removably attached to the bottom wall 38. Thus, the shock structures 26, 28 may be removable from the housing 24 as a single unit, or may be separately removable from the housing 24. It may be desirable to remove one or both of the shock structures 26, 28 from the housing, for example, for repair or for replacement with another shock structure or structures presenting different physical characteristics that generate seismic waves with different characteristics.

The shock structure 26 may be constructed of virtually any rigid material or combination of materials, such as steel or other metal. The shock cavity 36 may be between about six inches and about eighteen inches in length, between about two inches and about eight inches in width, and between about one inch and about four inches in depth.

The hammer 30 is driven by the actuator 34 to impart kinetic energy into the apparatus 10 and the ground, thus generating seismic waves in the ground. The actuator 34 may impart a striking motion to the hammer 30 wherein the hammer 30 impacts the strike surface 42 as a result of the striking motion. Alternatively, the actuator 34 may impart vibratory movement to the hammer 30 wherein the hammer 30 oscillates within the cavity 36 but does not strike any portion of the shock structure 26. In that scenario, acceleration and deceleration of the hammer 30 generates seismic waves in the ground by transferring kinetic energy to the housing 24 through the first actuator 34. Operation of the shock assembly 12 is described in greater detail below.

The hammer 30 includes a hammer body 56, a first insert 58 separable from the body 56 and a second insert 60 separable from the body 56. As used herein, the inserts 58, 60 are "separable" from the body 56 if they are configured to be separated from the body 56 and replaced without altering or damaging the structure of the hammer 30. Each of the first insert 58 and the second insert 60 may be attached to the body 56 of the hammer 30 using bolts or similar fasteners. A metal strip 62 provides a contact for the seismic survey system 18 and may be secured to one of the inserts 58, 60.

The removable inserts 58, 60 allow the user to change the physical characteristics of the hammer 30 and, consequently, the characteristics of seismic waves generated by the hammer 30. Removing one or both of the inserts 58, 60, for example, reduces the weight of the hammer 30 which affects the acceleration and speed of the hammer 30 and the amount of energy transferred from the hammer 30 to the shock structure 26 through the strike surface 42. Alternatively, one or both of the inserts 58, 60 may be removed and replaced with different inserts bearing different physical properties, such as weight, that generate seismic waves with different properties.

The hammer 30 includes through-holes 64 that engage the rails 50 as the hammer moves within the cavity 36. The hammer 30 is configured to be removable from the shock structure 26 for repairs or replacement. The hammer 30 is removed from the shock structure 26 by removing the collars 52 to allow the rails 50 to be disengaged from the hammer 30 and disengaging the hammer 30 from the piston 54. Disengaging the hammer 30 from the piston 54 may involve, for example, removing a bolt or other fastener as well as one or more springs and/or retainers, described above. A hammer is mounted in the shock structure 26 by reversing this process.

It will be appreciated that the configuration of the shock structure 26 and the hammer 30 allows users to modify the physical characteristics of the hammer 30 and, thus, characteristics of seismic waves generated by the shock structure 26. Physical characteristics of the hammer 30 may be altered by removing or replacing one or both of the inserts 58, 60, and the hammer 30 may be replaced in its entirety by another hammer presenting different characteristics. Testing has determined, for example, that in some embodiments hammers made of denser (heavier) materials tend to generate seismic waves with lower frequency content and hammers made of less dense (lighter) materials generate seismic waves of higher frequencies. Hammers made of iron, for example, generated seismic waves with lower frequency content while hammers made of aluminum generated seismic waves with higher frequency content. Thus, the shock structures 26, 28 and/or the hammers 30, 32 may be selected from various available shock structures and hammers to meet the needs of a particular use or application.

Figure 5:
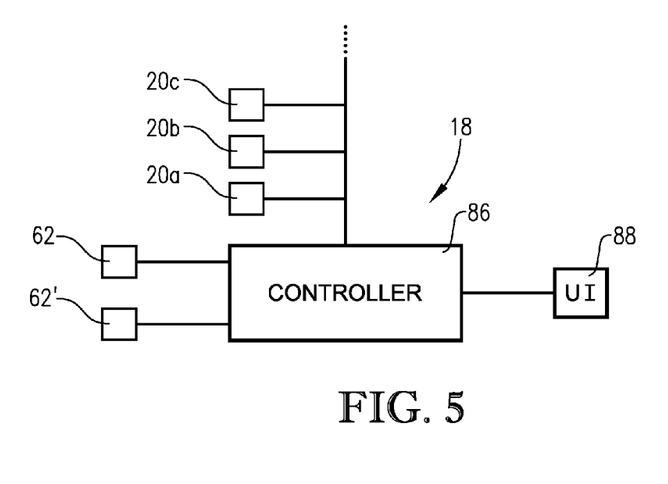
FIG. 5 is a schematic diagram of a seismic survey system with which the apparatus of FIG. 1 may be used.

As mentioned above, the hammer 30 may include a metal strip 62 providing a contact for the seismic survey system 18. More particularly, the strip 62 may communicate a signal to the seismic survey system 18 each time the hammer 30 strikes the strike surface 42 of the shock structure 26. The survey system 18 may use the signal, for example, for timing operation of the sensors 20, for timing operation of an imaging apparatus, or both. While the metal strip 62 provides a relatively simple and inexpensive trigger for the survey system 18, other trigger devices and methods are within the ambit of the present invention. By way of example, optical or inductive sensors may be used in place of or in addition to the metal strip 62.

The hammer 30 may be virtually any size, shape and configuration and may be constructed of any of various materials. In some embodiments, the hammer 30 weighs between about two pounds and about ten pounds and may particularly weigh, for example, about four pounds, about five pounds or about six pounds.

Figure 1:
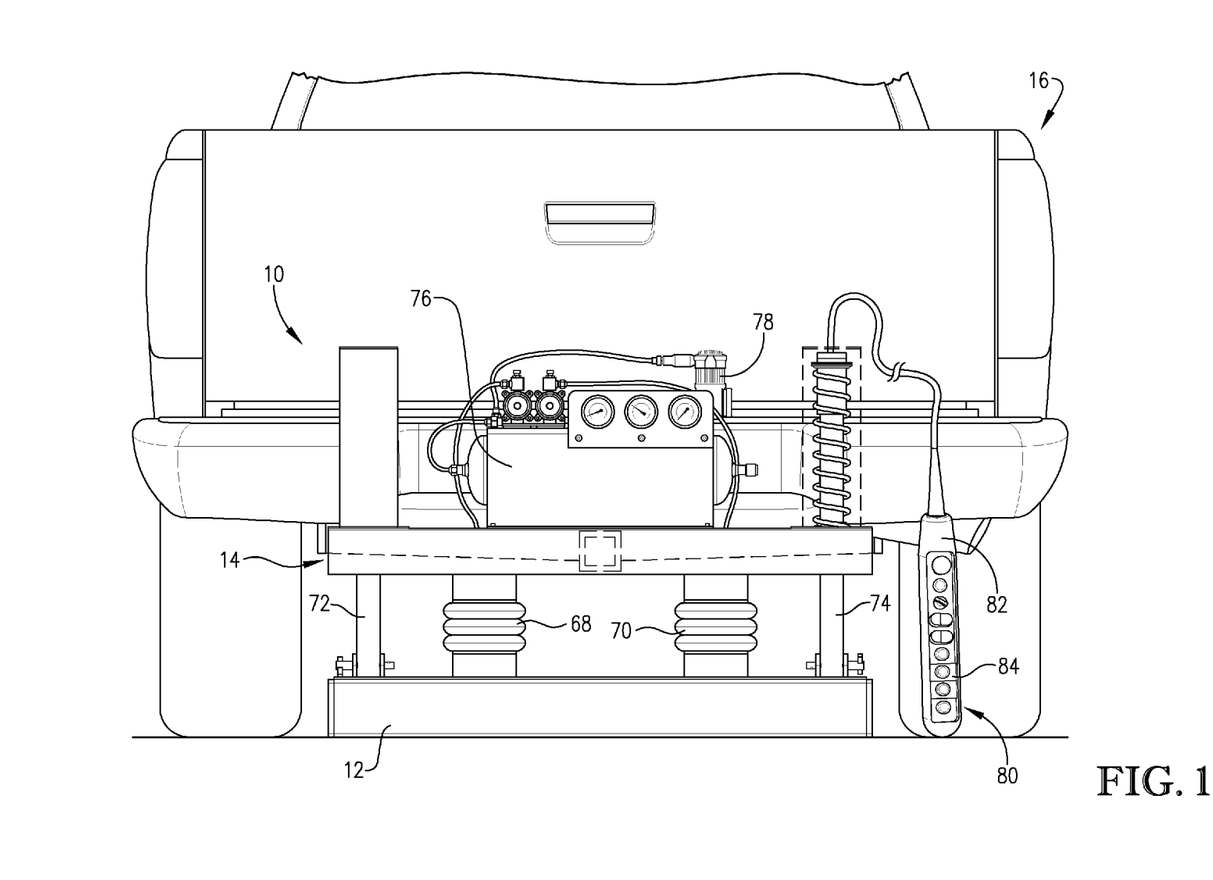
FIG. 1 is a rear elevation view of a seismic source apparatus constructed in accordance with an embodiment of the invention.

The mounting assembly 14 secures the apparatus 10 to the vehicle 16 and moves the seismic shock assembly 12 between deployed and refracted positions. The mounting assembly 14 broadly includes mounting hardware 66, a pair of extension mechanisms 68, 70 for moving the shock assembly 12 relative to the mounting assembly 14, a pair of arms 72, 74 for stabilizing and guiding movement of the shock assembly 12 relative to the mounting assembly 14, and a second actuator 76 for driving the extension mechanisms 68, 70. In the illustrated embodiment, the mounting hardware 66 includes a metal tube that engages a hitch receiver or similar mechanism on the vehicle 16 and locks in place in the hitch receiver in a manner similar to a standard tow hitch.

Each of the extension mechanisms 68, 70 includes pistons or other elements operable to extend and retract when driven by the second actuator 76. In some embodiments the second actuator 76 is a pneumatic actuator using compressed air to drive pneumatic pistons in the extension mechanisms 68, 70. The mounting assembly 14 may apply substantial downward pressure, such as between two hundred and one thousand pounds, on the shock assembly 12 during use. Therefore, the mounting hardware 66, extension mechanisms 68, 70 and other components of the mounting assembly 14 are sufficiently strong to endure repeated application of such high pressure. The arms 72, 74 guide movement of the shock assembly 12 while preventing lateral movement of the shock assembly 12 relative to the apparatus 10, and may include springs for biasing the shock assembly toward the refracted position.

When the shock assembly 12 is in the deployed position, as illustrated in FIG. 1, it engages the ground such that the walls of the shock structures 26, 28 are normal to the surface of the ground. Because the strike surface 42 is normal to the surface of the ground, the impact of the hammer 30 against the strike surface 42 generates seismic shear waves in the ground. When the shock assembly 12 is in the refracted position it is separated from the surface of the ground by a distance and the apparatus 10 is supported entirely by the vehicle 16. The shock assembly 12 may be placed in the retracted position when travelling to a testing location, for example, or when travelling between seismic surveys.

The mounting assembly 14 may include any of various types of actuators, including electric, hydraulic or pneumatic actuators for driving operation of the extension mechanisms 68, 70.

Figure 6:
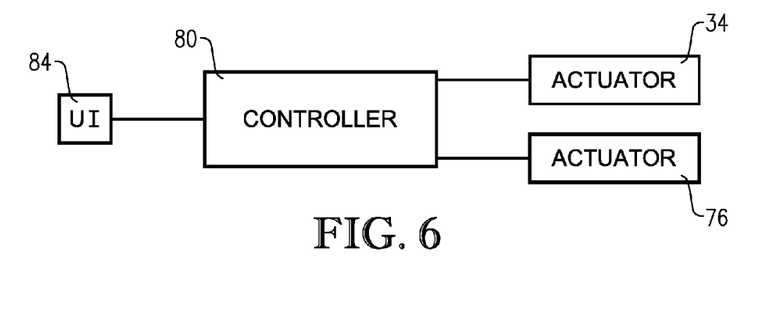
FIG. 6 is a schematic diagram of a controller of the apparatus of FIG. 1.

A controller 80 manages operation of the mounting assembly 14 and the shock assembly 12 and may be housed in a console 82 that includes one or more buttons, switches, displays or other user interface 84 elements. In particular, the controller 80 directs operation of the first actuator 34 and the second actuator 76. The controller 80 may communicate with the mounting assembly 14 and the shock assembly 12 remotely via a wired or wireless connection. In some embodiments, a user may hold the console 82 and operate the apparatus 10 from a remote position, such as inside the vehicle 16.

The controller 80 may include a digital integrated circuit such as, for example, a general use computer processor or a programmable logic device configured for operation with the circuit receiver. The controller 80 may further include memory elements for storing data, instructions, or both used by the integrated circuit to implement the functionality of the controller 80. The functionality of the controller 80 may be implemented by components housed in the console 82 and/or in another section of the apparatus 10, such as in the shock assembly 12, the mounting assembly 14, or both.

In operation, the apparatus 10 is secured to the vehicle 16 by, for example, coupling the mounting hardware 66 to a hitch receiver. The apparatus 10 may be connected to the vehicle's 16 power system by connecting a power connector of the apparatus 10 (not shown) to a corresponding connector on the vehicle 16 that is located on or near the vehicle's bumper and thus is proximate the apparatus 10 when the apparatus 10 is attached to the vehicle 16.

The seismic sensor array 22 may also be secured to the vehicle 16, such as in the manner illustrated in FIG. 2. With the vehicle 16 and the sensor array 22 in position, the mounting assembly 14 is actuated to deploy the shock assembly 12 in preparation for performing a seismic survey. Deploying the shock assembly 12 may involve directing the second actuator 76 to drive the extension mechanisms 68, 70 downward such that the shock assembly 12 engages the ground. The second actuator 76 applies sufficient downward pressure on the shock assembly 12 such that the energy from the hammer strikes is transferred to the ground. Thus, the shock assembly 12 must generally be held against the ground with sufficient force that the shock assembly 12 does not move relative to the ground when the hammers 30, 32 impact the shock structures 26, 28. As explained above, downward force of one thousand pounds or more on the shock assembly 12 may be required to effectively transfer energy from the shock assembly 12 to the ground.

When the shock assembly 12 is deployed the user directs the shock assembly 12 to generate one or more seismic waves by controlling the first actuator 34 to move the hammers 30, 32 in a striking motion wherein the hammers 30, 32 impact strike surfaces of the shock structures 26, 28. The first actuator 34 may drive one of the hammers 30, 32 to generate a single strike, may first drive one of the hammers 30, 32 to generate a strike and then drive the other of the hammers 30, 32 to generate a strike, or may cause one or both of the hammers 30, 32 to repeatedly strike the shock structure or shock structures. Alternatively, the controller 80 may direct the first actuator 34 to move one or both of the hammers 30, 32 in an oscillating motion without striking any surfaces of the shock assembly 12. In that scenario, the acceleration and deceleration of one or both of the hammers 30, 32 transfers energy to the shock assembly 12 and the ground, as explained above. As used herein, a hammer oscillates without striking a surface if it does not impact any surface with sufficient force to cause a detectable seismic disturbance.

While the seismic waves associated with hammer strikes include multiple frequency components (see, for example, FIGS. 7-9), seismic waves generated by hammer oscillations generally include a single frequency component corresponding to the hammer oscillation frequency. Furthermore, the seismic waves generated by hammer oscillations are continuous and can be manipulated by adjusting the oscillation frequency of the hammers. It may be desirable, for example, to conduct a seismic survey across a range of frequencies beginning with a low frequency and gradually increasing to a high frequency, or vice-versa. By way of example, the apparatus 10 may be operable to oscillate the hammers 30, 32 at a frequency of between 0 and 150 Hz to generate seismic waves at any frequency within that range.

In some implementations, the hammers 30, 32 are operated to generate seismic waves that are identical in magnitude and frequency but are 180° out of phase. The seismic survey system 18 may use the two signals to increase the integrity of the survey by combining the signals to identify and eliminate noise.

The controller 80 may adjust operation of the first actuator 34 to alter the characteristics of the striking motion of the hammers 30, 32 and to change the characteristics of the seismic waves resulting from the movement and/or impact of the hammers 30, 32. More particularly, the controller 80 may adjust operation of the actuator 34 to increase or decrease the acceleration or speed of the hammers 30, 32, as well as the frequency of the hammer strikes. By way of example, the rate of acceleration of the hammers 30, 32 may be within the range of from about 10 m/sec$^2$ to about 50 m/sec$^2$, and may particularly be about 20 m/sec$^2$, about 25 m/sec$^2$, about 30 m/sec$^2$, about 35 m/sec$^2$ or about 40 m/sec$^2$. The maximum speed of the hammers 30, 32 and/or the speed at which the hammers 30, 32 strike a surface of the shock structures 26, 28 may be from about 1 m/sec to about 5 m/sec and may particularly be about 2 m/sec, about 3 m/sec or about 4 m/sec.

The seismic survey system 18 includes a controller 86 that collects data from the sensors 20 and from the metal strips 62, 62', processes the data, and generates information about the subterranean area under survey. The generated information may be presented to a user via a user interface 88 in the form of an image, paper trace or other human-readable form of expression.

Figure 7:
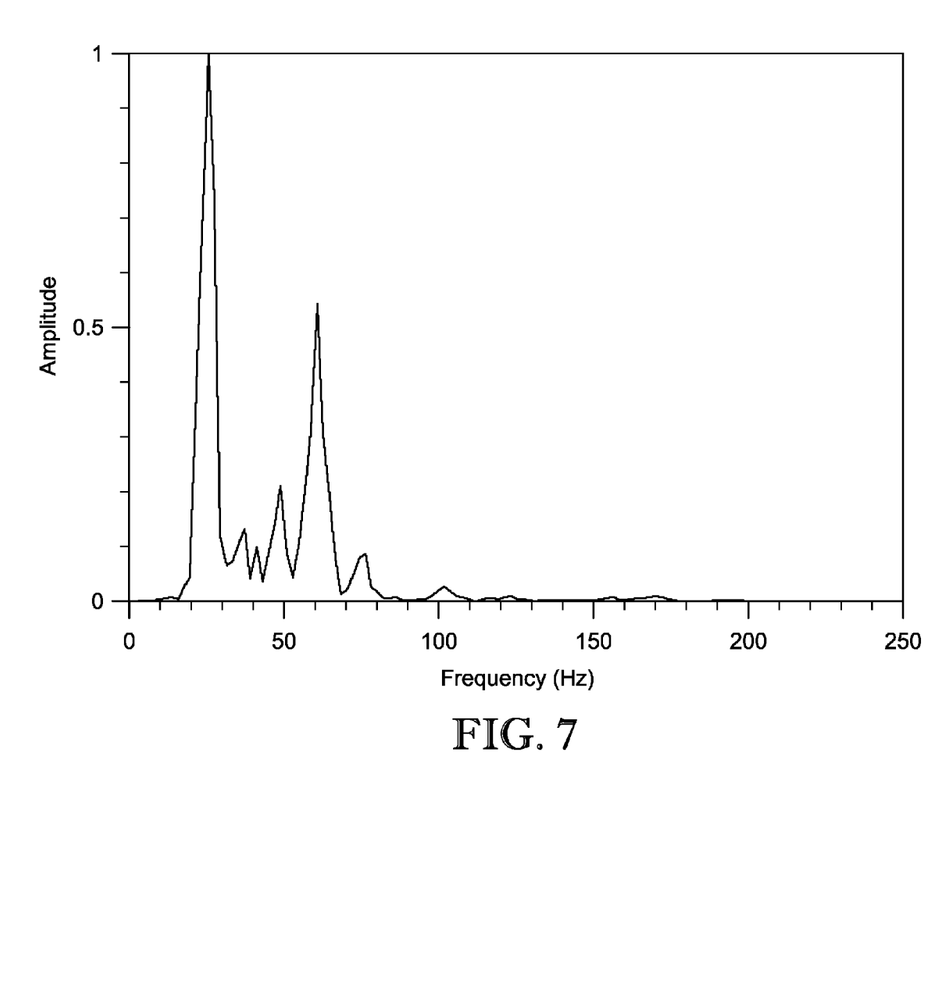
FIG. 7 is a graph of an exemplary seismic frequency response of a manual seismic source using a five pound sledge hammer.
Figure 8:
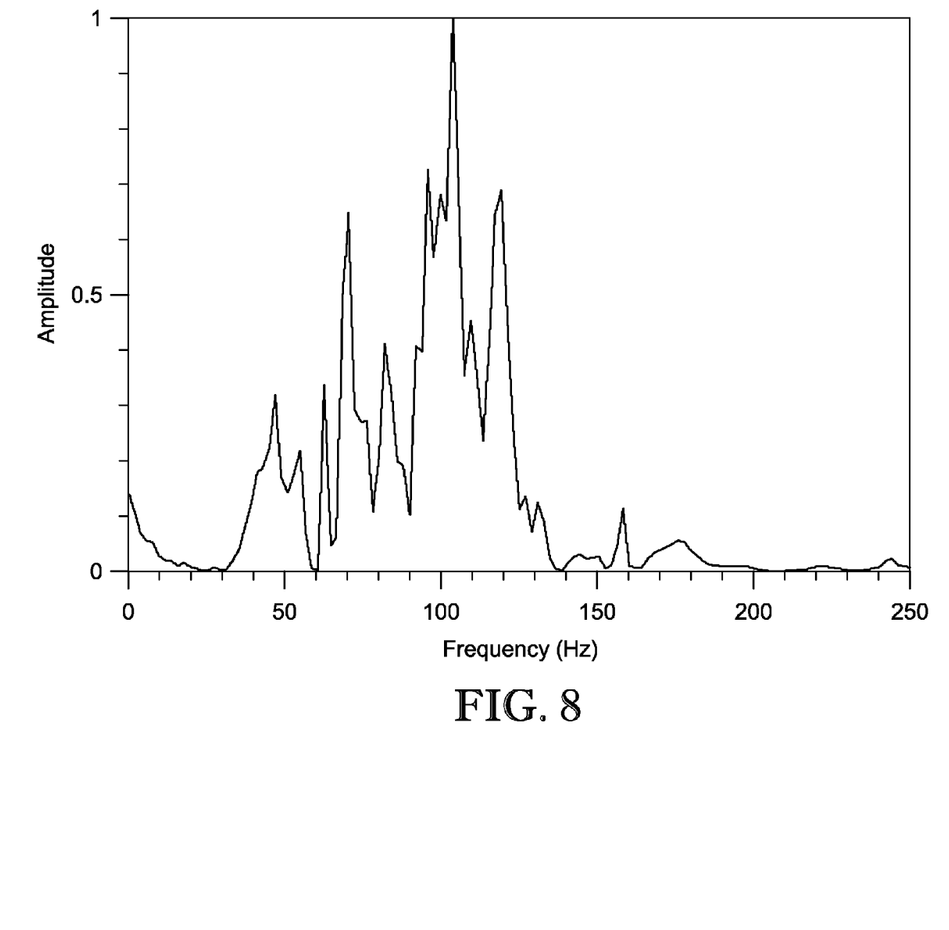
FIG. 8 is a graph of an exemplary seismic frequency response of the seismic source of the present invention.
Figure 9:
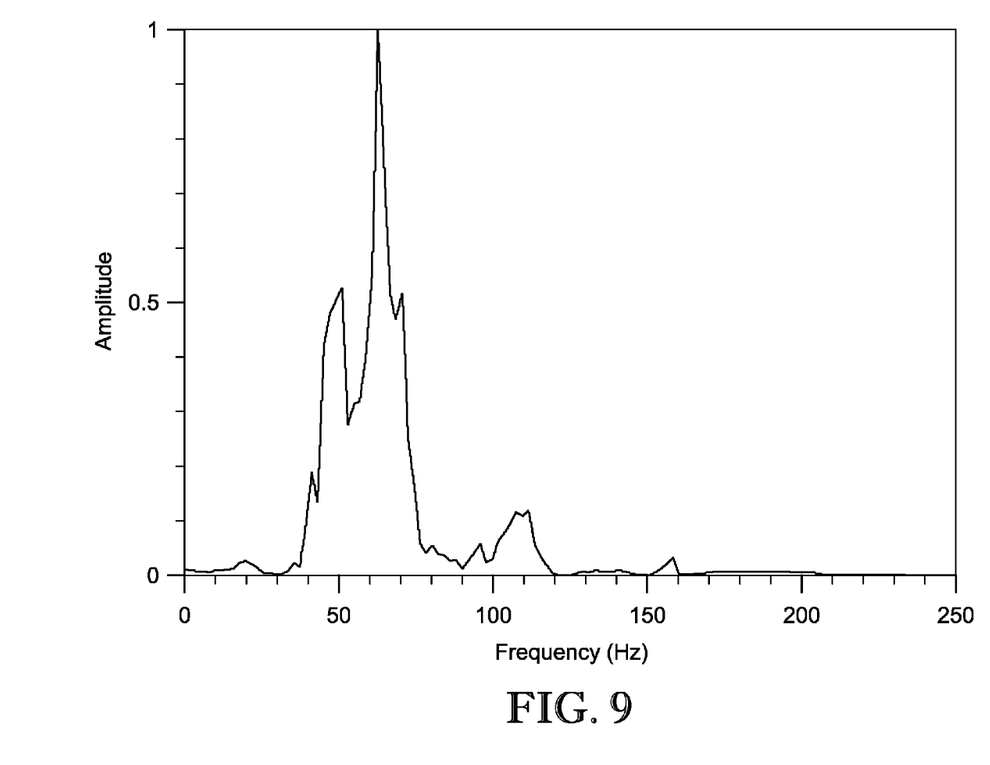
FIG. 9 is a graph of an exemplary seismic frequency response of a manual seismic source using a ten pound sledge hammer.

FIGS. 7-9 illustrate an advantage of the apparatus 10 over existing seismic survey systems. FIG. 7 is a graph of the frequency content of an exemplary seismic shear wave generated manually using a ten pound sledge hammer, and FIG. 9 is a graph of the frequency content of an exemplary seismic shear wave generated manually using a two pound sledge hammer. FIG. 8 is a graph of the frequency content of an exemplary seismic shear wave generated by the apparatus using a five pound hammer. As illustrated, the apparatus generates a seismic wave including strong frequency components across a greater range of frequencies than either the two pound sledge hammer or the ten pound sledge hammer. The stronger frequency profile of the waves generated by the apparatus 10 is advantageous because seismic waves encompassing a broader range of seismic frequencies are capable of reacting to a broader range of subterranean discontinuities, thereby enabling the system 18 to generate more detailed information about the area under survey.

It will also be appreciated that the apparatus 10 improves upon the performance of a manual sledge hammer by generating uniform and repeatable seismic waves symmetrically about an linear sensor array, such as the array 22. For any given deployment of the shock assembly 12, for example, each strike of the hammer 30 (and of the hammer 32) will generate substantially identical seismic waves. By way of example, the controller 86 may use multiple data sets based on identical seismic waves to identify and ignore statistically outlying characteristics of the data.

The apparatus 10 is well suited for use with the system 18 to detect relatively small subterranean voids at relatively small depths. The apparatus 10 could be used, for example, to detect tunnels created for human passage, which may be less than five feet across and less than three hundred feet deep.

Although the invention has been described with reference to the preferred embodiment illustrated in the attached drawing figures, it is noted that equivalents may be employed and substitutions made herein without departing from the scope of the invention as recited in the claims. By way of example, the shock cavity may be defined by structural elements integrally formed in the shock assembly housing rather than by removable shock structures.

Having thus described the preferred embodiment of the invention, what is claimed as new and desired to be protected by Letters Patent includes the following:

1. An apparatus for generating seismic waves, the apparatus comprising:
    a housing;
    a strike surface within the housing;
    a hammer movably disposed within the housing;
    a pair of rails extending along a direction of movement of the hammer within the housing and being symmetrically offset from a center of the hammer for guiding movement of the hammer within the housing, the hammer being slidably mounted on the pair of rails;
    an actuator for inducing a striking motion in the hammer wherein the hammer impacts the strike surface as part of the striking motion, the actuator being selectively adjustable to change characteristics of the striking motion and characteristics of seismic waves generated by the impact; and a mounting assembly configured to couple the apparatus to a hitch receiver of a vehicle in a manner similar to a standard tow hitch so that the apparatus may be completely supported by the vehicle when the apparatus is not deployed.

2. The apparatus of claim 1, the actuator configured to move the hammer in a reciprocating motion along a linear path that is normal to the strike surface.

3. The apparatus of claim 1, the actuator being operable to move the hammer in a reciprocating motion along a linear path and without striking any portion of the housing.

4. The apparatus of claim 1, the actuator including a linear electric motor.

5. The apparatus of claim 1, further comprising a shock structure removably disposed within the housing and defining a shock cavity, the strike surface being an interior surface of the shock cavity and the hammer being disposed within the shock cavity.

6. The apparatus of claim 5, the hammer being removably disposed within the shock cavity.

7. The apparatus of claim 1, the housing being configured such that when the housing is placed on contact with a ground surface, the impact of the hammer against the strike surface generates shear seismic waves in the ground.

8. The apparatus of claim 1, further comprising a mounting assembly configured to secure the apparatus to a vehicle and to move the apparatus between a deployed position and a retracted position, wherein when the apparatus is in the deployed position the housing engages a ground surface and the strike surface is normal to the ground surface.

9. The apparatus of claim 8, the mounting assembly including a pneumatic actuator for moving the apparatus between the deployed position and the retracted position.

10. The apparatus of claim 1, the hammer including a first portion and a second portion, the second portion being separable from the first portion.

11. The apparatus of claim 1, the hammer weighing between two pounds and ten pounds and including a first portion made of a first material and a second portion made of a second material, the second portion being separable from the first portion.

12. The apparatus of claim 11, the hammer presenting a rectangular shape, weighing between four pounds and six pounds, and including an aluminum portion and at least one steal portion separably coupled with the aluminum portion.

13. An apparatus for generating seismic waves, the apparatus comprising:
    a housing;
    a strike surface within the housing;
    a hammer movably disposed within the housing;
    an actuator for inducing a striking motion in the hammer wherein the hammer impacts the strike surface as part of the striking motion, the actuator being selectively adjustable to change characteristics of the striking motion and characteristics of seismic waves generated by the impact; and
    a mounting assembly configured to couple the apparatus to a hitch receiver of a vehicle in a manner similar to a standard tow hitch so that the apparatus may be completely supported by the vehicle when the apparatus is not deployed.

14. The apparatus of claim 13, the mounting assembly is configured to move the apparatus between a deployed position and a retracted position, wherein when the apparatus is in the deployed position the housing engages a ground surface and the strike surface is normal to the ground surface.

15. The apparatus of claim 14, the mounting assembly includes a pneumatic actuator for moving the apparatus between the deployed position and the retracted position.

16. The apparatus of claim 15, the hammer including a first portion and a second portion, the second portion being separable from the first portion.

17. The apparatus of claim 16, the first portion being removable and being configured to be replaced with a different portion bearing different physical properties for generating seismic waves with different properties.

18. The apparatus of claim 13, the hammer being removable and being configured to be replaced with a different hammer bearing different physical properties for generating seismic waves with different properties.

19. An apparatus for generating seismic waves, the apparatus comprising:
- a housing;
- a hammer movably disposed within the housing;
- a pair of rails extending along a direction of movement of the hammer within the housing and being symmetrically offset from a center of the hammer for guiding movement of the hammer within the housing, the hammer being slidably mounted on the pair of rails;
- an actuator for inducing continuous oscillating motion in the hammer wherein the oscillating motion of the hammer creates a seismic wave, the actuator being configured to move the hammer in a reciprocating motion along a linear path that is normal to the strike surface and being selectively adjustable to change characteristics of the oscillating motion and characteristics of seismic waves generated by the motion;
- a set of seismic sensors attached to a straightenable line and configured to be spaced apart from each other and aligned in a linear configuration when the vehicle is driven forward;
- a mounting assembly configured to couple the apparatus to a hitch receiver of a vehicle in a manner similar to a standard tow hitch so that the apparatus may be completely supported by the vehicle when the apparatus is not deployed; and
- at least one extension mechanism for moving the housing relative to the mounting assembly between a deployed position and a retracted position, the housing being configured to engage a ground surface when the apparatus is in the deployed position.

* * * * *